US009066326B2

(12) United States Patent
Narayan et al.

(10) Patent No.: US 9,066,326 B2
(45) Date of Patent: Jun. 23, 2015

(54) AUTOMATIC USER NOTIFICATION, WITH QUICK RESPONSE (QR) CODE GENERATION FOLLOWING FAILED NFC DEVICE PAIRING

(71) Applicant: Motorola Mobility LLC, Libertyville, IL (US)

(72) Inventors: Shyam Narayan, Grayslake, IL (US); Naveen Aerrabotu, Gurnee, IL (US); Rohit R. Sinha, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 160 days.

(21) Appl. No.: 13/802,851

(22) Filed: Mar. 14, 2013

(65) Prior Publication Data
US 2014/0273820 A1  Sep. 18, 2014

(51) Int. Cl.
*H04B 5/00* (2006.01)
*H04W 76/02* (2009.01)
*H04W 12/06* (2009.01)
*H04W 12/04* (2009.01)
*H04L 29/14* (2006.01)

(52) U.S. Cl.
CPC ............ *H04W 76/023* (2013.01); *H04W 12/06* (2013.01); *H04W 12/04* (2013.01); *H04L 69/40* (2013.01)

(58) Field of Classification Search
CPC ....... G06F 21/31; G06F 13/385; G06F 21/30; H04L 63/08; H04L 65/1069; H04L 63/105; H04L 63/062; H04L 12/14; H04L 41/0886; H04L 63/0442; G06Q 20/382; G06Q 20/322; G06Q 20/401; G06Q 20/20; G06Q 20/3274; G06Q 30/02; H04W 12/06; H04W 8/265; H04W 76/02; H04W 76/023; H04W 48/18; H04W 4/001; H04W 4/008
USPC .......................... 340/10.1, 10.3, 10.4, 870.01; 345/156–159; 455/39, 41.1–41.3, 455/412.2, 404.1, 418; 705/14.66, 39, 23, 705/26.1, 44, 26.8, 27.1, 26.82, 41, 5
See application file for complete search history.

(56) References Cited

U.S. PATENT DOCUMENTS 8,321,917 B2     11/2012  Kikkawa et al.
2007/0140191 A1*  6/2007  Kojima .......................... 370/338
(Continued)

OTHER PUBLICATIONS

TraQR, Trackable Dynamic QR Codes, Trackable Dynamic QR Codes—TrakQR, Dec. 26, 2012, http://trakqr.com/, all pages.

*Primary Examiner* — Golam Sorowar
(74) *Attorney, Agent, or Firm* — Shumaker & Sieffert, P.A.

(57) ABSTRACT

A first user equipment (UE) includes a display, at least two communication mechanisms that respectively supports a first and a second communication mode, and a processor communicatively coupled to the display and the communication mechanisms. The first UE further includes a failed pairing notification (FPN) utility that configures the first UE to: initiate communication with a second UE via a first communication mode; and in response to a trigger condition indicating that the first communication mode is not supported at either the first UE or the second UE, generate a notification alerting a user of the first UE that (1) a different communication mode is required for the first UE to communicate with the second UE and (2) an authorization QR code is required to be exchanged between the first UE and the second UE as an authentication mechanism before the communication can be established via the different communication mode.

18 Claims, 7 Drawing Sheets

(56) References Cited

U.S. PATENT DOCUMENTS

| | | |
|---|---|---|
| 2007/0201081 A1 | 8/2007 | Murayama |
| 2009/0073946 A1* | 3/2009 | Morita .......................... 370/338 |
| 2009/0163240 A1* | 6/2009 | Ryu et al. ................... 455/553.1 |
| 2012/0322384 A1 | 12/2012 | Zerr et al. |
| 2014/0156319 A1* | 6/2014 | Deeb ................................ 705/5 |
| 2014/0197232 A1* | 7/2014 | Birkler et al. ................ 235/375 |

* cited by examiner

AUTOMATIC USER NOTIFICATION, WITH QUICK RESPONSE (QR) CODE GENERATION FOLLOWING FAILED NFC DEVICE PAIRING

BACKGROUND

1. Technical Field

The present disclosure generally relates to pairing of user equipments (UEs) and in particular to providing notification of a failed pairing of two UEs. Still more particularly, the present disclosure relates to use of quick response (QR) codes to support pairing of two UEs following pairing failure.

2. Description of the Related Art

Personal electronic devices or user equipment (UE), such as smart phones, tablets, and others are widely utilized to store data content. Several of these devices can include a pairing mechanism by which a first UE is able to communicatively connect to a second UE and exchange data content via a created pairing or communication channel. The data content on the first UE can then be shared with the second UE via a pairing scheme involving the two devices being placed in proximity to each other and communicating using pairing technology, such as near field communication (NFC) or Bluetooth®. Occasionally, an attempt by a first UE to pair with a second UE fails because one of the devices may not support the specific pairing technology. Presently, such failures can go undetected or unresolved. Also, the pairing of two UEs can require an exchange of a pairing credential for the first device and/or the second device to be able to access another device and/or the data content stored therein.

The use of quick response (QR) codes has grown over the years as a mechanism for providing direct access via a QR image to a website or other information that is embedded within the QR image. With most personal devices now including a display and a QR code scanner, the exchange of QR codes from one device to another via direct QR image capture is possible.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

Figure 1:
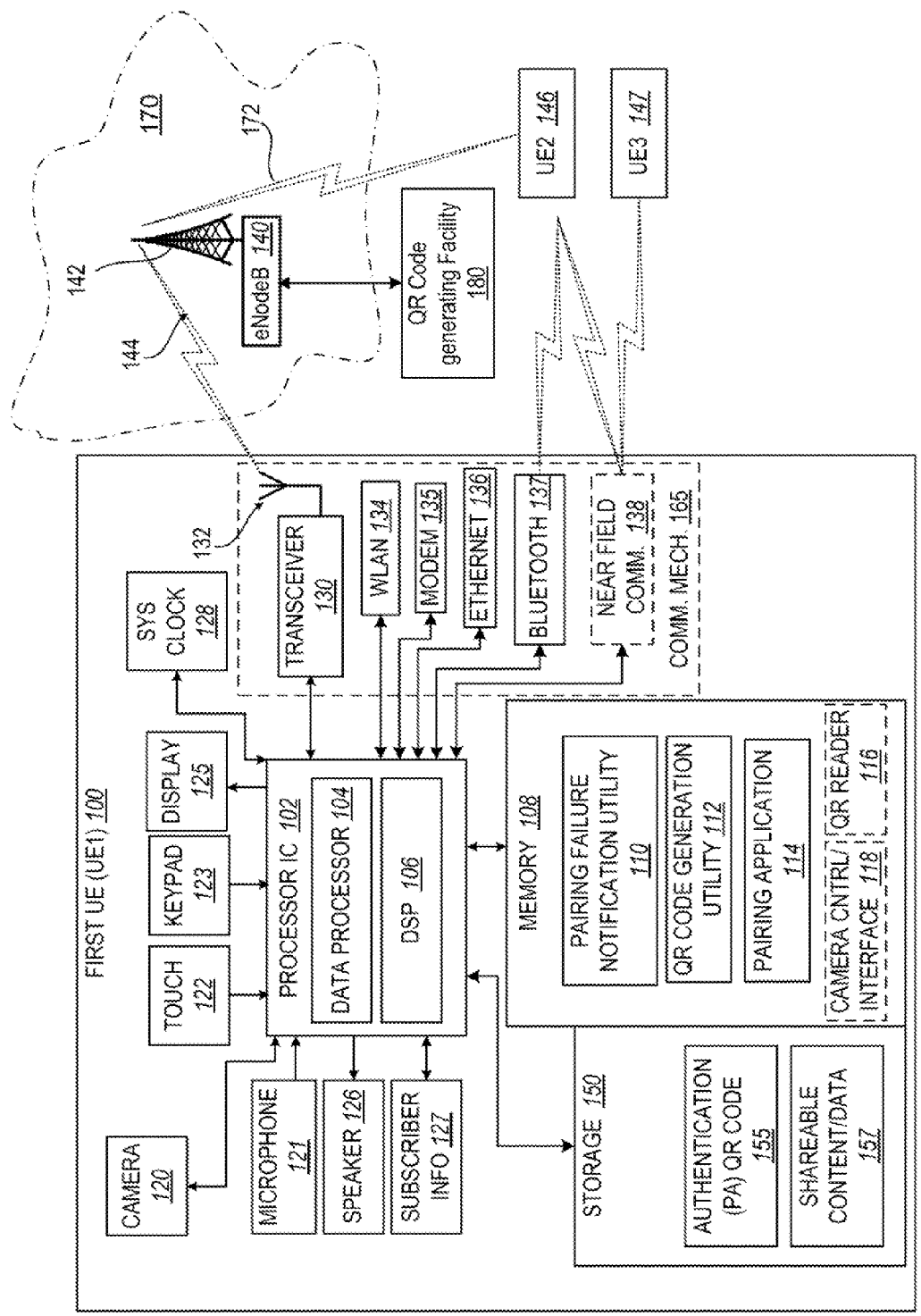
FIG. 1 provides a block diagram representation of an example user equipment (UE) configured with various functional components that enable one or more of the described features of the disclosure, according to one embodiment.

The illustrative embodiments of the present disclosure provide a method and user equipment (UE) that provides automatic user notification and authentication quick response (QR) code generation following a failed pairing with a second UE. In the UE implementation, a first user equipment (UE) includes a display, at least two communication mechanisms that respectively supports a first and a second communication mode, and a processor communicatively coupled to the display and the communication mechanisms. The first UE further includes a pairing failure notification (PFN) utility that executes on the processor and configures the first UE to: initiate communication with a second UE via a first communication mode; and in response to at least one trigger condition that indicates that the first communication mode is not supported at either the first UE or the second UE, generate a notification alerting a user of the first UE that (1) a different communication mode is required for the first UE to communicate with the second UE and (2) an authorization QR code is required to be exchanged between the first UE and the second UE as an authentication mechanism before the communication can be established via the different communication mode.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

FIG. 1 depicts a block diagram representation of an example first user equipment (UE1) within which several of the features of the disclosure can be implemented. According to the general illustration, first UE (UE1) 100 is a communication device that is designed to communicate with other devices via one of a wireless communication network, generally represented by base station (evolution node B, eNodeB) 140 and antenna 142, and one or more pairing technologies, e.g., Bluetooth® 137 and near field communication (NFC) device 138. UE1 100 can be one of a host of different types of devices, including but not limited to, a mobile cellular phone or smart-phone, a laptop, a net-book, an ultra-book, and/or a tablet computing device. These various devices all provide and/or include the necessary hardware and software to enable pairing of UE1 with a second UE, e.g., UE2 146, notification of a failure of a pairing attempt, and generation of an authentication QR image for use during subsequent pairing of UE1 100 with a second UE. Additionally, UE1 100 includes the hardware and software to support the various wireless or wired communication functions.

Referring now to the specific component makeup and the associated functionality of the presented components, UE1 100 comprises processor integrated circuit (IC) 102, which connects via a plurality of bus interconnects (illustrated by the bi-directional arrows) to a plurality of functional components of UE1 100. Processor IC 102 can include one or more programmable microprocessors, such as a data processor 104 and a digital signal processor (DSP) 106, which may both be integrated into a single processing device, in some embodiments. The processor IC 102 controls the communication, image capture, and other functions and/or operations of UE1 100. These functions and/or operations thus include, but are not limited to, application data processing and signal processing.

Connected to processor IC 102 is memory 108, which can include volatile memory and/or non-volatile memory. One or more executable applications can be stored within memory for execution by data processor 104 on processor IC 102. For example, memory 108 is illustrated as containing pairing failure notification (PFN) utility 110, which can include QR code generation utility 112, and pairing application (or utility) 114. The associated functionality and/or usage of each of the software modules will be described in greater detail within the descriptions which follow. In particular, the functionality associated with and/or provided by PFN utility 110 and the other functional modules contained therein is described in greater detail with the description of FIG. 2 and several of the flow charts and other figures. It is appreciated that the various software modules can be independent modules that communicate with each other via processor execution of respective code.

In one embodiment, and particularly where UE1 100 is utilized as the device that is being used to capture an image of a QR code from a second device, UE1 100 can also include QR reader 116 and/or camera interface utility 118. Also, in one or more embodiments, QR code generation utility 112 can be configured to access an externally located QR code generating facility 180. As illustrated, access to QR code generating facility 180 can be via wireless network 170, although alternate access modes can also be supported. QR code generating facility 180 can be a server that is accessible via the Internet utilizing a specific universal resource locator (URL) programmed into QR code generation utility 112, in one embodiment.

Also shown coupled to processor IC 102 is storage 150 which can be any type of available storage device capable of storing one or more application software and data. It is further appreciated that in one or more alternate embodiments, the device storage can actually be remote storage and not an integral part of the device itself. As provided, storage 150 contains current authentication QR code 155, which can be interchangeably referred to as pairing access QR code 155, and shareable data content 157. The specific usage and/or functionality associated with these components are described in greater detail in the following descriptions.

UE1 100 also comprises a plurality of input/output (I/O) devices, including one or more input devices, such as camera 120, microphone 121, touch screen and/or touch pad 122, keypad 123, and/or one or more output devices, such as display 125, speaker 126, and others. UE1 100 can also include a subscriber information module (SIM) 127 which can provide unique identification information of the subscriber that owns or utilizes UE1 100, as well as specific contacts and device settings associated with the particular subscriber. In order to allow UE1 100 to provide time data, UE1 100 also includes system clock 128.

According to one aspect of the disclosure and as illustrated by FIG. 1, UE1 100 supports at least one and potentially many forms of wireless, over-the-air communication, which allows UE1 100 to transmit and receive communication with at least one second device. As a device supporting wireless communication, UE1 100 can be one of, and be referred to as, a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, such as a laptop, tablet, smart phone, personal digital assistant, or other processing devices connected to a wireless modem. To support the wireless communication, UE1 100 includes one or more communication components, including transceiver 130 with connected antenna 132, wireless LAN module 134, Bluetooth® transceiver 137 and near field communication transceiver module 138. As further illustrated, UE1 100 can also include components for wired communication, such as modem 135 and Ethernet module 136. Collectively, these wireless and wired components provide a communication means or mechanism 165 by which UE1 100 can communicate with other devices and networks. For purposes of the following illustrations and associated descriptions thereof, the first communication mode is assumed to be NFC, supported by NFC transceiver module 138 (FIG. 1), while the second communication mode is assumed to be Bluetooth®, supported by Bluetooth® transceiver 137.

The wireless communication can be via a standard wireless network, which includes a network of base stations, illustrated by evolution Node B (eNodeB) 140 and associated base station antenna 142. A first over-the-air signal 144 is illustrated interconnecting base station antenna 142 with local antenna 132 of UE1 100. Additionally, communication with the at least one second device can be established via near field communication transceiver module 138. In at least one embodiment, UE1 100 can exchange communication with one or more second devices, of which UE2 146 and UE3 147 are illustrated. As described in further detail below, each of UE2 146 and UE3 147 can be second devices with which UE1 100 can establish a communication channel, using over-the-air signal transmission, following the exchange of specific authentication and/or access credentials. The path of communication between UE1 100 and the second devices can be via near field communication, Bluetooth, or via wireless network 170, as indicated by the second over-the-air signal 172 between base station antenna 142 and UE2 146.

Figure 2:
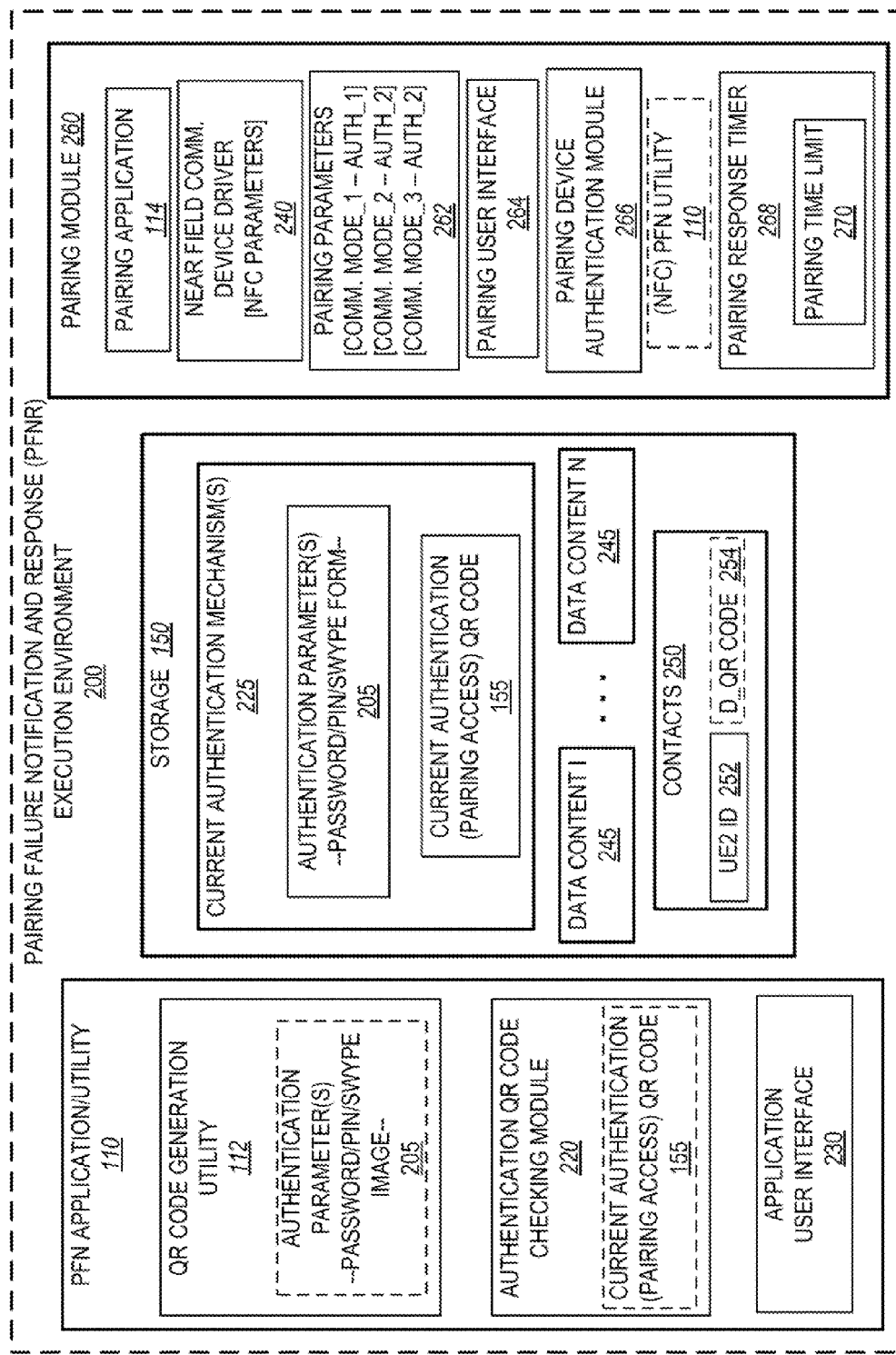
FIG. 2 illustrates an example Pairing Failure Notification and Response (PFNR) environment with QR code generation functions, according to one or more embodiments.

FIG. 2 illustrates a more detailed diagram of an example Pairing Failure Notification and Response (PFNR) execution environment 200. PFNR execution environment 200 includes a combination of hardware, firmware, software and data components, which collectively performs the various aspects of the disclosure by execution of PFN utility 110 and other functional components on data processor 104 (FIG. 1) and/or embedded device controllers. As shown, PFNR execution environment 200 includes PFN utility 110, which comprises QR code generation utility 112, authentication QR code checking module 220, and application user interface 230. QR code generation utility 112 receives one or more current device pairing access authentication parameter(s) 205 as input, and generates a corresponding authentication (or pairing access) QR code 155 representing the current pairing authentication parameter(s) 205.

In one or more implementations, the current device pairing access authentication parameter(s) 205 can include one or more of a password, a login-password combination, an alphanumeric pin, a swipe input sequence, or other form of authentication parameter. The current authentication parameter(s) 205 can be randomly generated or manually inputted by a user of UE1 100 within application user interface 230. In one or more embodiments, QR code generation utility 112 comprises firmware, which packages and transmits the current authentication parameter(s) 205 to an external QR code generating facility 180 (FIG. 1), such as a website on a remote server. The QR code generating facility 180 then generates the corresponding QR code 155, and returns the QR code 155 to UE1 100. In these implementations, the transmission of the authentication parameters 205 and subsequent return transmission of the corresponding QR code 155 can occur via wireless network 170 (FIG. 1) or other communication medium.

Authentication QR code checking module 220 performs a comparison of a received QR code being provided as the access authentication mechanism by a second device requesting access to link to UE1 100 via a pairing channel. Authentication QR code checking module 220 either checks the received QR code against the current authentication QR code 155 (e.g., via QR image matching) or deciphers the received QR code and checks the deciphered parameters against the current authentication parameter(s) 205.

PFNR execution environment 200 also comprises non-volatile storage 150, within which is maintained several types of data and information germane to execution of the various different utilities. Specifically, storage 150 includes current authentication mechanisms 225, which comprises both current authentication parameter(s) 205 and current authorization QR code 155. Also maintained in storage 150 is data content 245, which can be divided into separate sets of data content, each having different requirements for security and/or being assigned different secure access parameters and/or being tagged for access by specific second devices. As further shown, storage 150 includes contacts 250, which is a database or list of known persons or second devices or subscribers with which UE1 100 can communicate. Each contact is represented by a separate row in contacts 250 and includes a contact ID and/or device ID 252 and, optionally, an associated access permission parameter, which is indicated as a device-specific QR code 254. Accordingly, one or more embodiments enable granular assignment of QR codes to specific second devices 252 for access to specific data content 245 on UE1 100.

PFNR execution environment 200 also includes pairing module 260, which controls the pairing functions of UE1 100 to one or more second devices. Pairing module 260 includes pairing application 114, NFC device driver 240, general pairing parameters 262, a pairing user interface 264, pairing device authentication module 266, and pairing response timer 268, with associated time limit parameter 270. Pairing module 260 can optionally include NFC utility 110, in one embodiment. Pairing device authentication module 266 checks the authentication and pairing parameters received from a second UE attempting to connect with UE1 100 to ensure the second UE has the correct QR code authorization to complete the pairing of devices. In one embodiment, pairing device authentication module 266 triggers authentication QR code checking module 220 to perform the authentication checking when a QR code is provided as the received authentication parameter. In an alternate embodiment, pairing device authentication module 266 can also perform the QR code checking features of authentication QR code checking module 220.

The above described features of UE1 100 (FIG. 1) and PFNR execution environment 200 (FIG. 2) presents a first aspect of the disclosure, which provides an electronic device (UE1 100) comprising: a display 125; at least two communication mechanisms (e.g., NFC 138 and Bluetooth® 137) that respectively support a first communication mode and a second communication mode; and a processor 104 that is communicatively coupled to the display 125 and the communication mechanisms 137, 138. The electronic device (100) further includes a pairing failure notification (FPN) utility 110 that executes on the processor 104 and configures the first UE 100 to: initiate communication with a second UE (e.g. UE2 146) via a first communication mode (e.g., NFC communication); and in response to at least one trigger condition that indicates that the first communication mode is not supported at either the first UE 100 or the second UE 146, generate a notification alerting a user of the first UE 100 that (1) a different communication mode (e.g., Bluetooth communication) is required for the first UE 100 to communicate with the second UE 146 and (2) an authorization QR code 155 is required to be exchanged between the first UE 100 and the second UE 146 as an authentication mechanism before the communication can be established via the different communication mode.

In an embodiment in which the first communication mode is near field communication (NFC), the at least one trigger condition is a failure to connect to the second device via NFC within a pre-set time limit from requesting an NFC connection and detection of the at least one condition includes monitoring for receipt of a pre-established NFC response from the second UE, which indicates that an NFC communication channel is established with the second UE. Also, the generating a notification comprises generating the notification in response to not receiving the pre-established NFC response from the second UE within the pre-set pairing time limit 270.

The PFN utility 110 further configures the first UE 100 to: generate the authentication QR code contemporaneously with generating the notification; display the authentication QR code on a display of the first device; and indicate within the notification that a user of the first device should alert a second user of the second device to copy the authentication QR code. According to one embodiment, the PFN utility 110 further configures the first UE to generate an electronic alphanumeric text based message for forwarding to a device ID associated with one of the second UE and a user of the second UE, where the text based message comprises at least one of a text message and an email message.

Also, in one embodiment, the PFN utility 110 configuring the first UE to generate the notification includes the utility configuring the first UE to: determine whether the first UE supports at least one different communication mode; assign the authentication QR code as the authentication mechanism for enabling access to content data of the first UE via the at least one different communication mode; and configure an access mechanism associated with the at least one different communication mode to require a transfer of the authentication QR code from the second UE to activate a communication channel via the at least one different communication mode prior to permitting transfer of the content data.

The QR code can comprise an access credential from among a Machine (MAC) address, a user name and password combination, an SSID, a Bluetooth MAC address, and WiFi Ad Hoc network pairing information. Also, in one or more embodiments, the PFN utility 110 further configures the first UE to communicate the authentication QR code to at least one second device by at least one of: (a) displaying the generated authentication QR code on a display of the first UE to allow a camera of a second device that is placed in proximity to the first UE to capture an image of the QR code, where authorization to access the first UE is limited to only second devices that are allowed to be placed in a position adjacent the display, within a proximate distance to the display at which an image of the authentication QR code can be captured; (b) transmitting the authentication QR code via a text message to a second device; and (c) transmitting the authentication QR code via one of an electronic and a wireless communication medium to a second device.

Additionally, in one embodiment in which the first UE does not actually have the hardware and/or firmware mechanisms required to support the first communication mode, but includes an application that supports such communication, the PFN utility 110 configuring the first UE to initiate communication with a second UE via a first communication mode comprises code that configures the first UE to detect a launch of an application at the first UE that supports establishment of a data transfer communication channel with a second UE via the first communication mode. The trigger condition would then include the detecting of the launch of the application, and the utility would further configure the first UE to: in response to detecting the launch of the application, check a configuration of the first UE to determine if the first UE is configured to support communication via the first communication mode; and in response to the first UE not being configured to support communication via the first communication mode, trigger the generating of the notification.

According to one or more embodiments, the utility configures the first UE to initiate communication by configuring the first UE to detect at least one of (a) a specific movement of the first UE relative to the second UE, (b) a tap of the first UE with the second UE, when the first UE supports NFC as the first communication mode, (c) a specific touch sequence on the screen of the first UE associated with pairing devices via the first communication mode, and (d) opening of an application on the first UE that is associated with pairing devices via the first communication mode.

Also, in one or more embodiments, configuring the device to generate the notification includes code that configures the first UE to provide notice to a user of the first UE that the second UE is required to physically scan the QR code from the first UE in order to establish a communication channel between the first UE and the second UE, wherein the first UE providing the notice comprises the first UE outputting the notification as at least one sensory notification from among an audible notification, a tactile notification, and a visual notification. In alternate embodiments, the audible notification, tactile notification, and visual notification can respectively include a beep, an alarm, a spoken audio, a vibration of the first UE, a text displayed on-screen, a flashing display, a pre-established coloring of the screen, and a prominent display of the authorization QR code.

Figure 4:
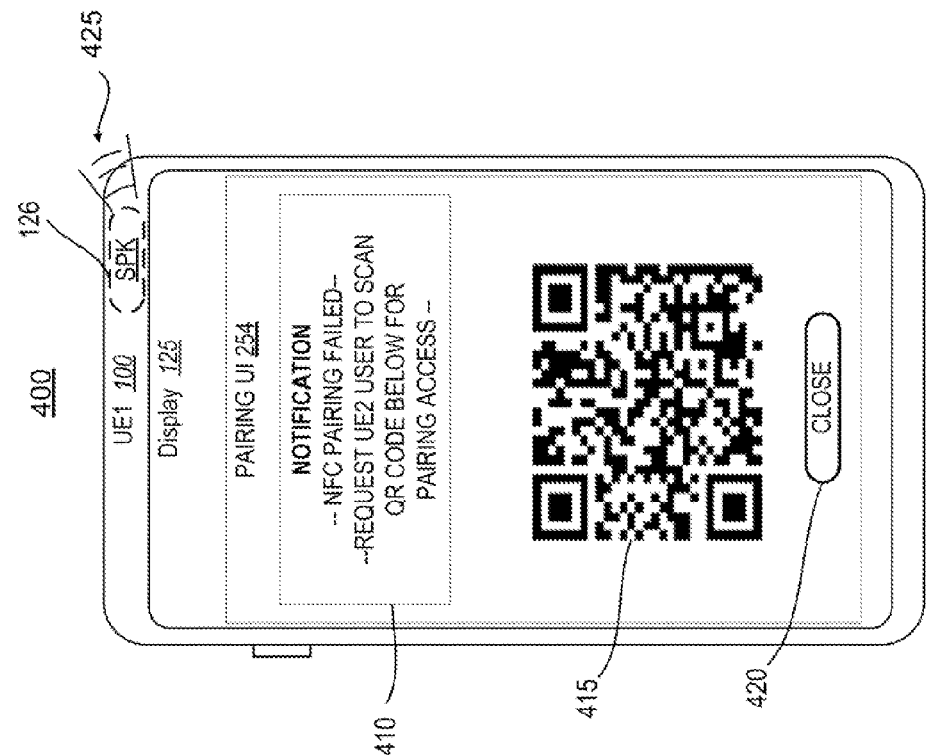
FIG. 4 illustrates an example notification on a user interface of a first user equipment following failed pairing of the first UE with a second UE, in accordance with one or more embodiments.
Figure 3:
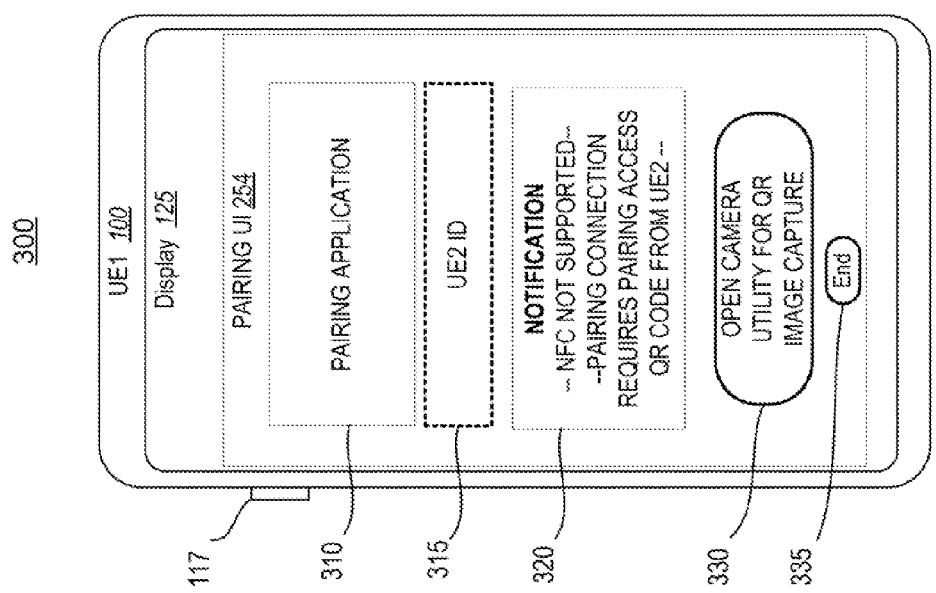
FIG. 3 illustrates a user equipment displaying an example user interface with an example notification that is generated following activation of a pairing-supported application when the user equipment is not configured for a first pairing communication mode, in accordance with one or more embodiments.

Turning now to FIGS. 3-4, there are illustrated two different views of UE1 100 and specifically features presented within different user interfaces on display 125 of UE1 100. Specifically, FIG. 3 presents an example user interface with an example notification that is generated following activation of a pairing-supported application when the user equipment is not configured for a first pairing communication mode. FIG. 4 then illustrates an example notification on a user interface of a first user equipment following failed pairing of the first UE with a second UE.

Within FIG. 3, UE1 100 is shown with display 125 presenting pairing UI 254. Pairing UI 254 comprises pairing application visual identifier 310, second device visual identifier 315, notification output 320. Pairing UI 254 also includes QR image capture prompt 330 and end soft button 335. The functionality associated with the first two visual identifiers 310, 315 is simply to provide a visual feedback of what processes are ongoing on the UE1 100. Notification output 320 represents a first failure notification that visually indicates to a user of UE1 100 who has activated an application in the background that triggered the pairing application that NFC is not supported by UE1 100. In one embodiment, the notification output 320 is generated and presented by PFN utility 110 (FIG. 1). In one or more embodiments, concurrently with the generation of the notification output 320, PFN utility 110 generates QR image capture prompt 330 to alert the user to request an authentication QR code from the second UE in order to complete a pairing of the devices using a second communication mode. A user of UE1 100 can elect to simply end the pairing application session on UE1 100 and close the pairing UI 254 by selecting the end soft button 335.

Turning now to FIG. 4, Pairing UI 254 is shown having both second notification output 410, a generated QR code image 415, and a close soft button 420. In the illustration of FIG. 4, the PFN utility 110 generates and presents second notification output 410 indicating that the attempted NFC pairing of UE1 100 with a second UE has failed. Further, notification output 410 includes instructions for the user of UE1 100 to request that user of the second UE scan the QR code image 415 that is presented on the screen of UE1 100 (within the pairing UI 254, in one embodiment). In addition to, or alternatively to the text based presentation of the notification, in one or more embodiments, UE1 100 can also support other types of notification, including audio notification, generally represented by the speaker 126 and audio output 425. As described herein, QR code image 415 is generated concurrently or contemporaneously with the generation of the second notification output 410. In one or more embodiments, QR code image 415 is automatically generated and presented by QR code generation utility 112 (FIG. 2) in scenarios where UE1 100 does support NFC pairing, but where the second device does not support NFC pairing or the second device fails to respond to a request to pair via NFC within the preset pairing time limit 270. When the QR code image 415 is being displayed on display 125 of UE1 100, UE1 100 supports transfer of authentication QR code image 415 via image capture by a second UE.

Figure 5:
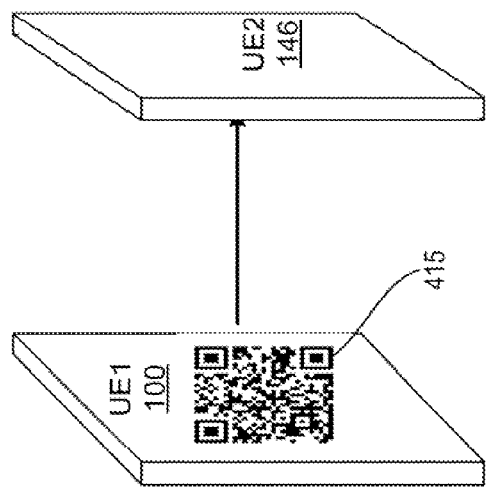
FIG. 5 illustrates an image transfer of an authorization QR code between a first UE and a second UE, in accordance with one or more embodiments.

FIG. 5 illustrates an example implementation scenario in which an image of a generated authentication QR code image 415 (FIG. 4) is communicated to a second device, UE2 146, in accordance with one embodiment. As shown, in order for direct image transfer, both UEs 100, 146 have to be placed face to face within a maximum distance from each other. These two requirements ensure that only a second device that is known to the user of UE1 100 will likely be in a position to capture the displayed QR code 100 and later utilize the QR code image 415 as the authentication parameter to access data content on UE1 100 via the second communication mode. An alternate mode of communicating the QR code image 415 to UE2 146 is also presented in FIG. 6.

Figure 6:
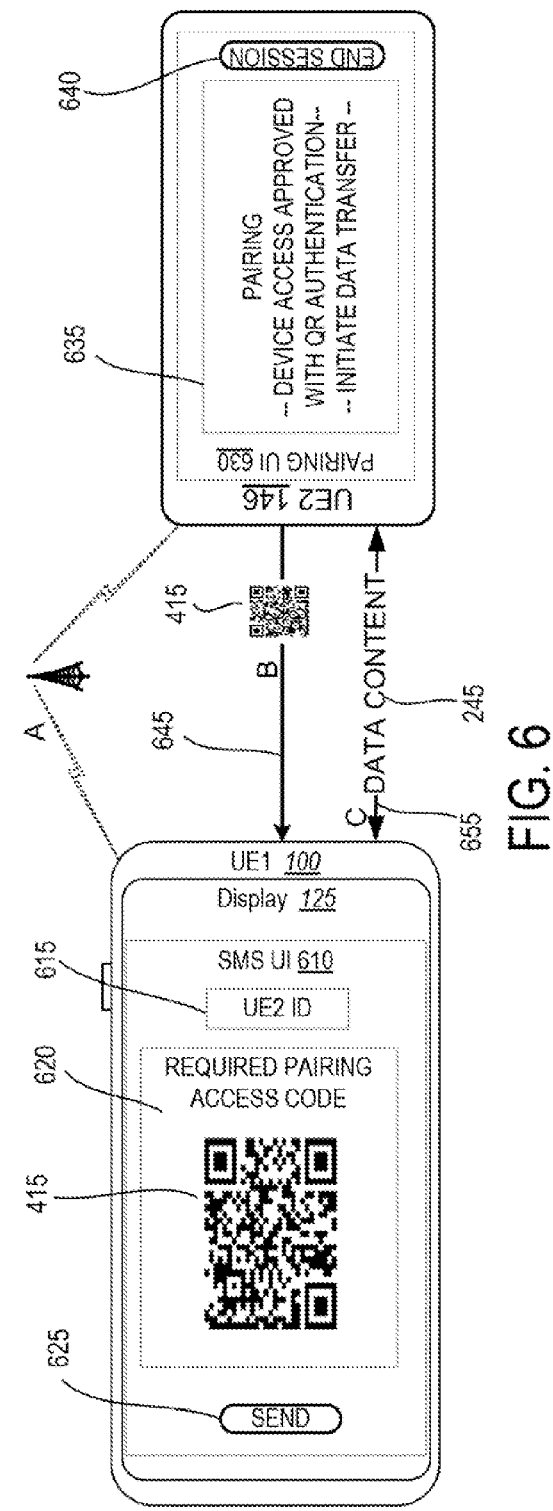
FIG. 6 illustrates an exchange between a first UE and a second UE that includes transmission of the authorization QR code via wireless network communication and subsequent pairing of the first and second UEs, in accordance with one or more embodiments.

FIG. 6 illustrates an example implementation scenario in which a second UE, UE2 146, receives the QR code image 415 via a wireless transfer of the QR code image 415 and then utilizes the received QR code image 415 to be paired with UE1 100 over a second communication mode, in accordance with one or more embodiments. To facilitate the use of QR code image 415 as the authentication mechanism for pairing between UE1 100 and UE2 146, UE1 100 can forward QR code image 415 to UE2 146 via wireless transmission channels, which are generally represented as path A. UE1 100 opens an SMS UI 610 and enters the UE2 ID as the target device ID 615. A user of UE1 100 also attaches QR code image 415 within the message content box 620 along with a notification to the user of UE2 that the QR code image 415 is required to initiate or authenticate pairing of the devices via the second communication mode. Once all information is entered, the user of UE1 100 selects the send soft button 625, which causes UE1 100 to transmit the QR code image 415 to UE2 146 via wireless communication channel A.

As shown, both devices are oriented in one of several possible pairing configurations. UE2 146 includes pairing UI 630 presented on display 125. Pairing UI 630 can present certain aspects of the pairing functions occurring on UE2 146 within a status output box 635, including three different status reports, namely, pairing, device access approved with QR authentication, and initiate data transfer. Pairing UI 630 includes an end session soft button 640, by which UE2 146 can terminate an ongoing pairing session. The connecting lines, B and C, extending between the devices indicate two communication paths during the pairing process, with content/data transfers occurring in the directions of the arrows. First connecting line 645 indicates a transfer of a copy of QR code image 415 from UE2 146 to UE1 100 as the access authentication mechanism during initial pairing. Once authentication is completed, a communication channel, represented as bi-directional arrow 655, is opened between the two devices and allows data content 245 to be transmitted between UE1 100 and UE2 146.

Figure 7:
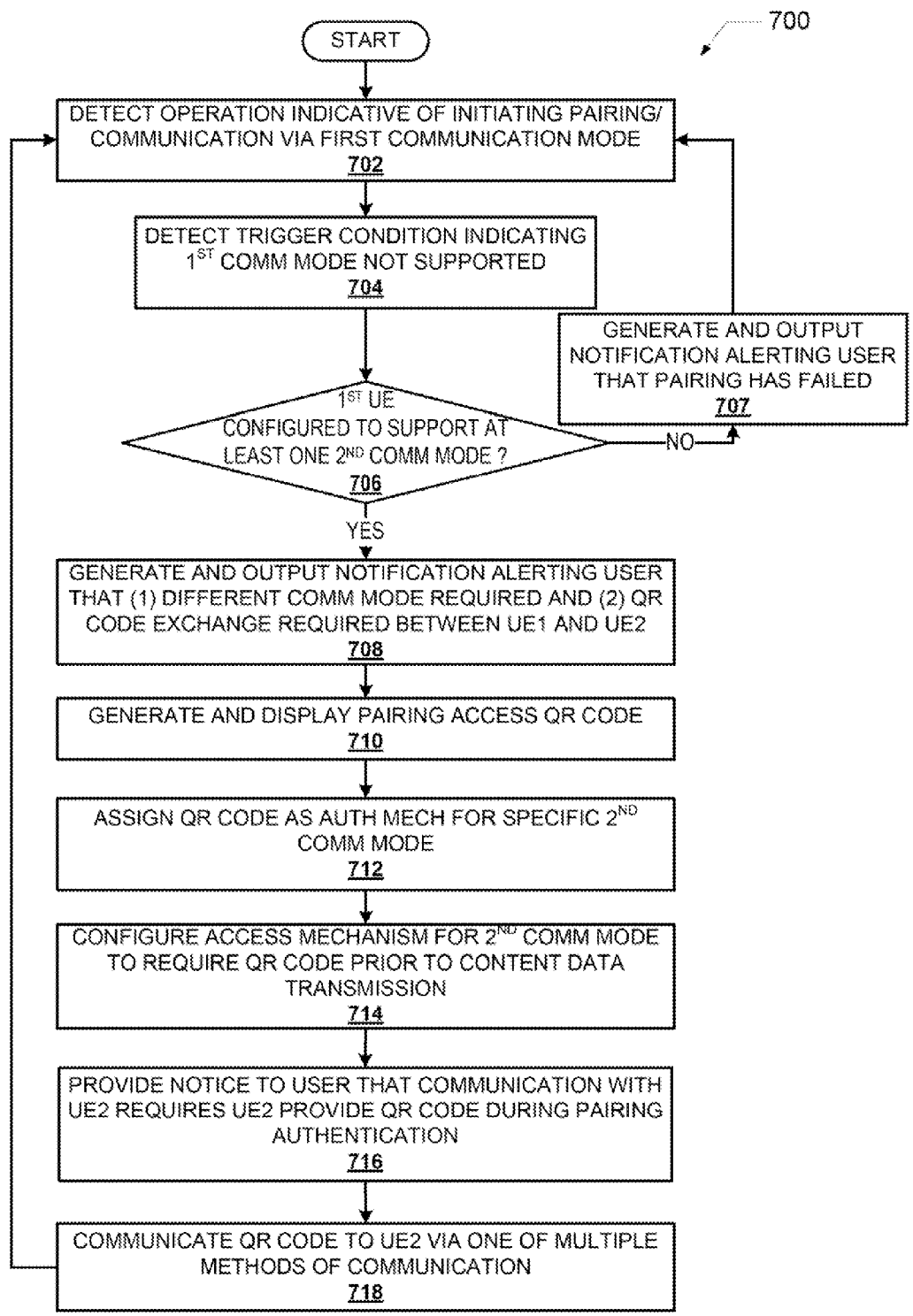
FIG. 7 is a flow chart illustrating a method by which a pairing failure is detected and a notification is generated requesting an exchange of a QR code between two UEs, according to one or more embodiments.
Figure 8:
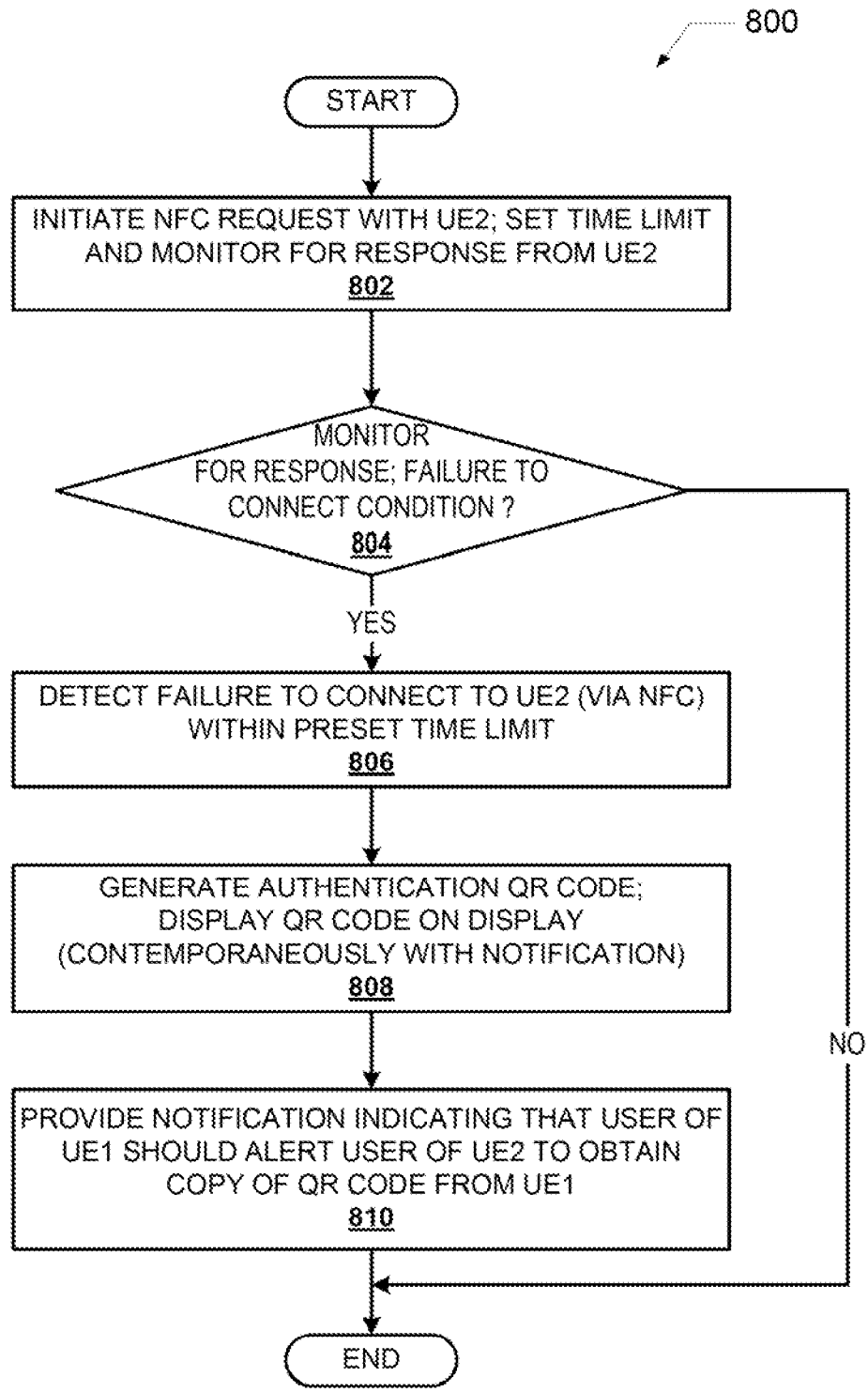
FIG. 8 is a flow chart illustrating a method by which a first UE generates a notification following a failure to receive a response from a second UE to a request for NFC device pairing with the second UE, according to one or more embodiments.
Figure 9:
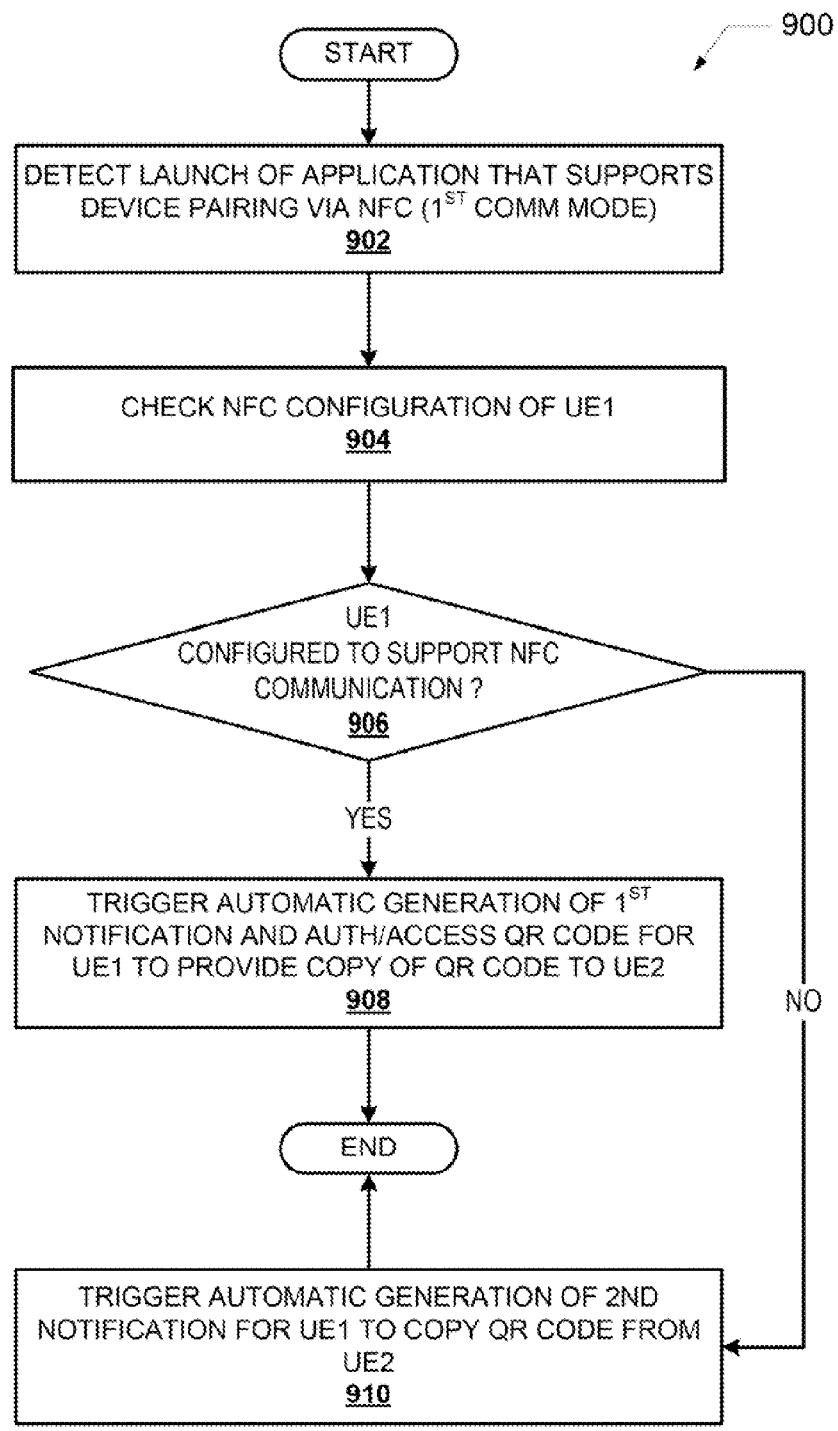
FIG. 9 is a flow chart illustrating a method by which a first UE generates a notification following detection of a trigger that includes activation of an application supporting NFC pairing to a second UE, according to one or more embodiments.

With reference now to the flow charts, FIG. 7 is a flow chart illustrating aspects of a method 700 by which pairing failure is detected and responded to by generation and presentation of a notification and QR code, according to one or more embodiments. FIG. 8 is a flow chart illustrating a method by which a first UE generates a notification following a failure to receive a response from a second UE to a request for NFC device pairing with the second UE, according to one or more embodiments. FIG. 9 is a flow chart illustrating a method by which a first UE generates a notification following detection of a trigger that includes activation of an application supporting NFC pairing to a second UE, according to one or more embodiments. With the descriptions which follow, certain aspects of the methods can be implemented by processor 104 executing code from one or more of PFN utility 110 and/or pairing module 260 and/or other software or firmware components of UE1 100. Generally, the methods 700/800/900 can be described as being performed by one or more of UE1 100, processor 104 or a specific utility, e.g., PFN utility 110, without limitation. Also, the various methods are described with reference to components and features of FIGS. 1-6, which provide specific examples of the embodiments described by the methods.

Referring to FIG. 7, method 700 begins at start block and proceeds to block 702 at which UE1 100 initiates a pairing or communication with a second UE via a first communication mode. According to the disclosure, this process of initiating the pairing or communication can be one of multiple different initiators, including, but not limited to, (i) detecting a specific movement of the first UE relative to the second UE, (ii) detecting a tap of the first UE with the second UE, when the first UE supports NFC as the first communication mode, (iii) detecting a specific touch sequence on the screen of the first UE associated with pairing devices via the first communication mode, and (iv) detecting opening of an application on the first UE that is associated with pairing devices via the first communication mode. The first three of the above list of initiators and the specific processing that are associated therewith are generally presented by the present figure with one aspect covered by FIG. 8, while the fourth initiator is presented by FIG. 9. Following the initiating of the pairing communication, UE1 100 detects a trigger condition that indicates that the first communication mode is not supported (block 704). The trigger condition may indicate that the first communication mode is not supported at either the first UE or the second UE. Then, processor 104 determines at decision block 706 whether UE1 100 supports at least one different communication mode. In the event that UE1 100 does not support a different communication mode, processor 104 generates and outputs a first notification indicating that pairing has failed (block 707), and the process returns to block 702 for detection of a next initiation of pairing communication. However, in response to UE1 100 supporting at least a second communication mode, UE1 100 generates and outputs a notification alerting a user of the first UE that (1) a different communication mode is required for the first UE to communicate with the second UE and (2) an authorization QR code is required to be exchanged between the first UE and the second UE as an authentication mechanism before the communication can be established via the different communication mode (block 708). Generating the alert involves processor 104 executing PFN utility 110 and selecting an alert appropriate for the actual trigger condition detected. Also, at block 710, processor 104 generates and displays a pairing access QR code 415. In one embodiment, generating the authentication QR code occurs contemporaneously with generating the notification, and the method includes displaying the authentication QR code on a display of UE1 100. According to one or more embodiments, the QR code can comprise an access credential from among a Machine (MAC) address, a user name and password combination, an SSID, a Bluetooth MAC address, and WiFi Ad Hoc network pairing information.

Following the generation of the QR code 415, processor 104 assigns the pairing access QR code as the authentication mechanism for enabling access to content data of the first UE via the at least one different communication mode (block 712). Processor 104 also configures an access mechanism associated with the at least one different communication mode to require a transfer of the authentication QR code from the second UE to activate a communication channel via the at least one different communication mode prior to permitting transfer of the content data (block 714). Then, at block 716, processor 104 generates and provides notice to a user of UE1 100 that the second UE is required to physically scan the QR code from the first UE and then utilize the QR code as the authentication mechanism to establish a pairing communication channel between the first UE and the second UE. According to one or more embodiments, providing the notice includes outputting the notification as at least one sensory notification from among an audible notification, a tactile notification, and a visual notification. Thus, in one or more implementations, the notice can include one or more of a beep, an alarm, a spoken audio, a vibration of the first UE, a text displayed on screen, a flashing display, a pre-established coloring of the screen, and a prominent display of the authorization QR code. At final block 718, method 700 provides that UE1 100 communicates the authentication QR code to at least one second UE by at least one of: (a) displaying the generated authentication QR code on a display of the first UE to allow a camera of the second UE that is placed in proximity to the first UE to capture an image of the authentication QR code, where authorization to access the first UE is limited to only second UEs that are allowed to be placed in a position above the display, within a proximate distance to the display at which an image of the authentication QR code can be captured; (b) transmitting the authentication QR code via a text message to a second UE; and (c) transmitting the authentication QR code via one of an electronic and a wireless communication medium to a second UE. In various implementations, method 700 further provides processor 104 generating an electronic alphanumeric text based message for forwarding to a device ID associated with one of the second UE and a user of the second UE, where the text based message comprises at least one of a text message and an email message. Method 700 then loops back to block 702 where UE1 100 waits for detection of a next attempt to initiate a pairing communication from UE1 100.

In one embodiment, the first communication mode is near field communication (NFC), and the at least one trigger condition is a failure to connect to the second device via NFC within a pre-set time limit from requesting an NFC connection. This embodiment is captured by method 800 of FIG. 8. Method 800 begins at start block and proceeds to block 802 at which UE1 100 initiates an NFC pairing request with UE2 146 and sets or establishes a time limit in which the request is expected to be responded to if pairing connection is successful (block 802). At decision block 804, method 800 provides UE1 100 monitoring for the response and determining whether the response is received within the preset time limit. Thus, detection of the at least one trigger condition (block 704, FIG. 7) includes monitoring for receipt of a pre-established NFC response from the second UE, which indicates that an NFC communication channel is established with UE2 146. In response to receipt of the response within the preset time limit, method 800 proceeds to end block. However, in response to not receiving the pre-established NFC response from UE2 within the pre-set time limit, processor 104 detects and/or registers a failure to connect to the UE within the preset time limit (block 806), generates a QR code and displays the authentication QR code 415 (FIG. 4) on the display of UE1 100 (block 808). Method 800 also includes processor 104 generating the notification and indicating within the notification that a user of the first UE should alert a second user of the second UE to copy the authentication QR code (block 810).

Turning now to FIG. 9, which illustrates the embodiment in which the trigger condition includes the detecting of the launch of the application. Method 900 begins at start block and proceeds to block 902 at which UE1 100 initiates communication with a second UE via a first communication mode includes processor 104 detecting a launch of an application at UE1 100 that supports establishment of a data transfer communication channel with a second UE via the first communication mode (block 902). Then, in response to detecting the launch of the application, processor 104 checks a configuration of the first UE (block 904) and determines, at decision block 906, if UE1 100 is configured to support communication via the first communication mode. In response to UE1 100 being configured to support communication via the first communication mode, method 900 includes processor 104 triggering the automatic generating and presenting a pairing access QR code and a first notification requesting the user of UE1 to provide a copy of the QR code to the second UE (block 908). However, in response to UE1 100 not being configured to support communication via the first communication mode, method 900 includes processor 104 triggering the automatic generating of a second notification for UE1 to copy a QR code from the second UE (block 910). Method 900 then ends.

In each of the flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
   initiating, with a first user equipment (UE), communication with a second UE via a first communication mechanism; and
   responsive to detecting at least one trigger condition that indicates that the first communication mechanism is not supported at either the first UE or the second UE:
      determining whether the first UE supports a different communication mechanism;
      assigning an authentication QR code as an authentication mechanism for enabling access to content data of the first UE via the different communication mechanism;
      outputting, by the first UE, a notification indicating that (1) the different communication mechanism is required for the first UE to communicate with the second UE and (2) the authentication QR code is required to be exchanged between the first UE and the second UE as the authentication mechanism before the communication can be established via the different communication mechanism;
      receiving, by the first UE and from the second UE, authentication information; and
      responsive to determining, by the first UE and based on the authentication information received from the second UE, that the second UE is authorized to pair with the first UE, establishing the communication via the different communication mechanism.

2. The method of claim 1, wherein:
   the first communication mechanism is near field communication (NFC);
   the at least one trigger condition is a failure to connect to the second device via NFC within a pre-set time limit from requesting an NFC connection; and
   the outputting of the notification is in response to not receiving a pre-established NFC response from the second UE within the pre-set time limit.

3. The method of claim 1, further comprising:
   generating the authentication QR code contemporaneously with outputting the notification; and
   displaying the authentication QR code on a display of the first UE,
   wherein the notification further indicates that a user of the first UE should alert a user of the second UE to copy the authentication QR code.

4. The method of claim 3, further comprising generating an electronic alphanumeric text based message for forwarding to a device ID associated with one of the second UE and a user of the second UE, where the text based message comprises at least one of a text message and an email message.

5. The method of claim 1, wherein:
   initiating the communication with the second UE via the first communication mechanism is in response to detecting a launch of an application at the first UE, wherein the application supports establishment of a data transfer communication channel with the second UE via the first communication mechanism;
   the trigger condition includes the detecting of the launch of the application; and
   the method further comprises:
      responsive to detecting the launch of the application, checking a configuration of the first UE to determine if the first UE is configured to support communication via the first communication mode; and responsive to the first UE not being configured to support communication via the first communication mode, triggering the outputting of the notification.

6. The method of claim 1, wherein the initiating communication is in response to at least one of (a) detecting a specific movement of the first UE relative to the second UE, (b) detecting a tap of the first UE with the second UE, when the first UE supports NFC as the first communication mechanism, (c) detecting a specific touch sequence on the screen of the first UE associated with pairing devices via the first communication mechanism, and (d) detecting opening of an application on the first UE that is associated with pairing devices via the first communication mechanism.

7. The method of claim 1, wherein the notification further indicates that the second UE is required to scan the QR code from the first UE in order to establish a communication channel between the first UE and the second UE, and wherein the outputting the notification comprises outputting the notification as at least one of an audible notification, a tactile notification, or a visual notification.

8. The method of claim 1, wherein the QR code comprises an access credential including one or more of a Machine (MAC) address, a user name and password combination, an SSID, a Bluetooth MAC address, or WiFi Ad Hoc network pairing information.

9. The method of claim 1, wherein outputting the notification comprises at least one of:
displaying the authentication QR code on a display of the first UE, wherein authorization to access the first UE is limited to UEs that are allowed to be placed in a position above the display and within a proximate distance to the display at which an image of the authentication QR code can be captured;
transmitting the authentication QR code via a text message to the second UE; and
transmitting the authentication QR code via one of an electronic and a wireless communication medium to the second UE.

10. A first user equipment (UE) comprising:
one or more communication mechanisms;
a processor that is communicatively coupled to the one or more communication mechanisms; and
a pairing failure notification (PFN) utility operable by the processor and configures the first UE to:
initiate communication with a second UE via a first communication mechanism of the one or more communication mechanisms; and
responsive to detecting at least one trigger condition that indicates that the first communication mechanism is not supported at either the first UE or the second UE:
determine whether the first UE supports a different communication mechanism;
assign an authentication QR code as an authentication mechanism for enabling access to content data of the first UE via the different communication mechanism;
output a notification indicating that (1) the different communication mechanism is required for the first UE to communicate with the second UE and (2) the authentication QR code is required to be exchanged between the first UE and the second UE as the authentication mechanism before the communication can be established via the different communication mechanism;
receive, from the second UE, authentication information; and
responsive to determining, based on the authentication information received from the second UE, that the second UE is authorized to pair with the first UE, establish the communication via the different communication mechanism.

11. The first UE of claim 10, wherein:
the first communication mechanism is near field communication (NFC);
the at least one trigger condition is a failure to connect to the second device via NFC within a pre-set time limit from requesting an NFC connection; and
the outputting of the notification is in response to not receiving a pre-established NFC response from the second UE within the pre-set time limit.

12. The first UE of claim 11, further comprising:
a display,
wherein the PFN utility further configures the first UE to:
generate the authentication QR code contemporaneously with outputting the notification;
display the authentication QR code on the display,
wherein the notification further indicates that a user of the first UE should alert a user of the second UE to copy the authentication QR code.

13. The first UE of claim 10, wherein the PFN utility further configures the first UE to generate an electronic alphanumeric text based message for forwarding to a device ID associated with one of the second UE and a user of the second UE, where the text based message comprises at least one of a text message and an email message.

14. The first UE of claim 10, wherein the PFN utility configures the first UE to:
detect a launch of an application at the first UE, wherein the application supports establishment of a data transfer communication channel with a second UE via the first communication mechanism, wherein the trigger condition includes the detecting of the launch of the application;
responsive to detecting the launch of the application, check a configuration of the first UE to determine if the first UE is configured to support communication via the first communication mechanism; and
responsive to the first UE not being configured to support communication via the first communication mode, trigger the outputting of the notification.

15. The first UE of claim 10, wherein the PFN utility configures the first UE to initiate communication in response to detecting at least one of (a) a specific movement of the first UE relative to the second UE, (b) a tap of the first UE with the second UE, when the first UE supports NFC as the first communication mechanism, (c) a specific touch sequence on the screen of the first UE associated with pairing devices via the first communication mechanism, and (d) opening of an application on the first UE that is associated with pairing devices via the first communication mechanism.

16. The first UE of claim 10, wherein the notification further indicates that the second UE is required to physically scan the QR code from the first UE in order to establish a communication channel between the first UE and the second UE, and wherein the first UE outputs the notification as at least one of an audible notification, a tactile notification, or a visual notification.

17. The first UE of claim 10, wherein the QR code comprises an access credential including one or more of a Machine (MAC) address, a user name and password combination, an SSID, a Bluetooth MAC address, or WiFi Ad Hoc network pairing information.

18. The first UE of claim 10, further comprising:
a display,
wherein the first UE to outputs the authentication QR code by at least one of:
  displaying the authentication QR code on the display of the first UE, wherein authorization to access the first UE is limited to devices that are allowed to be placed in a position above the display and within a proximate distance to the display at which an image of the authentication QR code can be captured;
  transmitting the authentication QR code via a text message to the second UE; and
  transmitting the authentication QR code via one of an electronic and a wireless communication medium to the second UE.

* * * * *